(12) United States Patent
Sakai

(10) Patent No.: US 12,075,188 B2
(45) Date of Patent: Aug. 27, 2024

(54) INFORMATION PROCESSING APPARATUS AND INFORMATION PROCESSING METHOD

(71) Applicant: SONY GROUP CORPORATION, Tokyo (JP)

(72) Inventor: Yusuke Sakai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 192 days.

(21) Appl. No.: 17/601,951

(22) PCT Filed: Mar. 6, 2020

(86) PCT No.: PCT/JP2020/009830
§ 371 (c)(1),
(2) Date: Oct. 7, 2021

(87) PCT Pub. No.: WO2020/213292
PCT Pub. Date: Oct. 22, 2020

(65) Prior Publication Data
US 2022/0191428 A1 Jun. 16, 2022

(30) Foreign Application Priority Data
Apr. 17, 2019 (JP) ................. 2019-078589

(51) Int. Cl.
*H04N 7/14* (2006.01)
*G06F 3/01* (2006.01)
*H04N 7/15* (2006.01)

(52) U.S. Cl.
CPC .............. *H04N 7/144* (2013.01); *G06F 3/013* (2013.01); *H04N 7/147* (2013.01); *H04N 7/152* (2013.01)

(58) Field of Classification Search
CPC ........ H04N 7/144; H04N 7/147; H04N 7/152; G06F 3/013
(Continued)

(56) References Cited

U.S. PATENT DOCUMENTS 7,549,120 B1 * 6/2009 Griffith ................. G06Q 10/10
715/234
9,344,821 B2 * 5/2016 Emery ..................... H04R 3/00
(Continued)

FOREIGN PATENT DOCUMENTS

CN 110494850 A 11/2019
JP 2001-057672 A 2/2001
(Continued)

OTHER PUBLICATIONS

International Search Report and Written Opinion of PCT Application No. PCT/JP2020/009830, issued on Jun. 9, 2020, 08 pages of ISRWO.

*Primary Examiner* — Binh Kien Tieu
(74) *Attorney, Agent, or Firm* — CHIP LAW GROUP

(57) ABSTRACT

An information processing apparatus includes a reception unit that receives data from a communication destination, an output unit that outputs the received data, a sensor that senses a first space in which the output unit is arranged, a transmission unit that transmits sensing data obtained by the sensing to the communication destination, and a control unit that performs control to present an event that is a cause of cognitive dissonance to the output unit, based on at least the sensing data of a user in the first space, when the user has the cognitive dissonance.

12 Claims, 10 Drawing Sheets

(58) Field of Classification Search
USPC .................................................. 348/14.16
See application file for complete search history.

(56) References Cited

U.S. PATENT DOCUMENTS

| | | | | |
|---|---|---|---|---|
| 10,162,505 | B2* | 12/2018 | Steeves | H04M 3/42051 |
| 11,694,786 | B1* | 7/2023 | Van Wilt | G16H 10/60 |
| | | | | 600/27 |
| 11,727,217 | B2* | 8/2023 | Ben-Kiki | G06F 40/30 |
| | | | | 709/204 |
| 2011/0063440 | A1* | 3/2011 | Neustaedter | H04N 7/147 |
| | | | | 348/143 |
| 2015/0286858 | A1 | 10/2015 | Shaburov | |
| 2016/0042648 | A1* | 2/2016 | Kothuri | G06V 40/166 |
| | | | | 434/236 |
| 2016/0140239 | A1* | 5/2016 | Allen | G06F 16/24522 |
| | | | | 707/733 |
| 2017/0098465 | A1* | 4/2017 | Karve | H04N 21/812 |
| 2018/0122371 | A1* | 5/2018 | Vangala | G10L 15/22 |
| 2019/0311212 | A1* | 10/2019 | Altuev | G06V 20/52 |
| 2020/0244380 | A1* | 7/2020 | Agrawal | G06F 3/0482 |
| 2021/0076002 | A1* | 3/2021 | Peters | H04N 7/152 |
| 2021/0082191 | A1* | 3/2021 | Tajik | G10H 1/0008 |
| 2021/0232219 | A1* | 7/2021 | Sugihara | G06T 19/00 |

FOREIGN PATENT DOCUMENTS

| | | |
|---|---|---|
| JP | 2008-294564 A | 12/2008 |
| JP | 2016-225869 A | 12/2016 |
| JP | 2018-088711 A | 6/2018 |
| WO | 2018/193687 A1 | 10/2018 |

\* cited by examiner

FIG.6
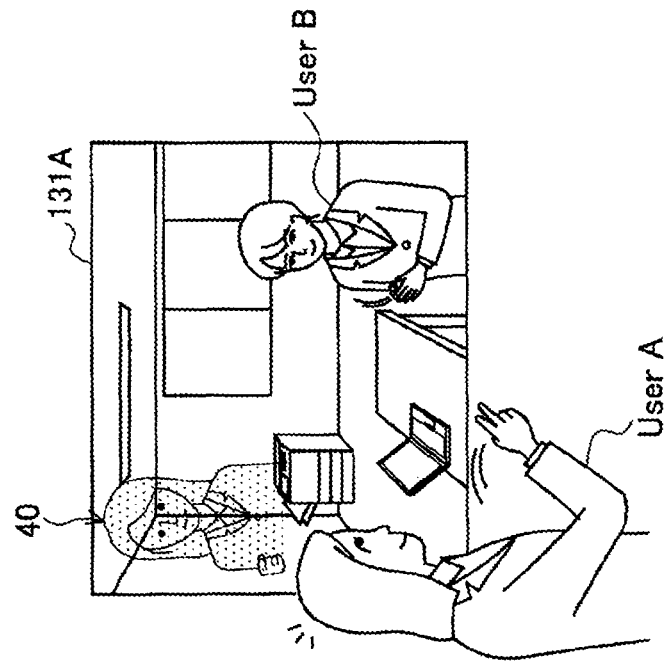
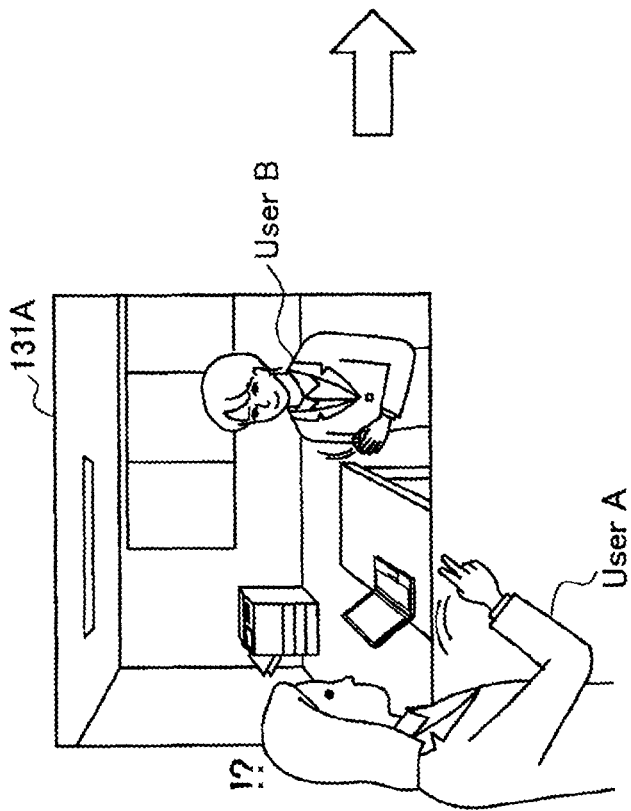

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/009830 filed on Mar. 6, 2020, which claims priority benefit of Japanese Patent Application No. JP 2019-078589 filed in the Japan Patent Office on Apr. 17, 2019. Each of the above-referenced applications is hereby incorporated herein by reference in its entirety.

FIELD

The present disclosure relates to an information processing apparatus, an information processing method, and a program.

BACKGROUND

A telepresence system that transmits and receives multimedia such as images, sounds, and moving images, in addition to characters, between remote locations, with the recent development of information processing technology is known. The telepresence system uses a high-quality voice, a high-resolution video, and the like, providing a realistic feeling as if users at the remote locations face to each other on the spot.

For example, in the following Patent Literature 1, transmission control of the telepresence (control of means and quality for multimedia telepresence) that is suitable for the situation of the other person and the situation of a user is performed.

Furthermore, Patent Literature 2 below proposes a system that performs ultra-low delay image processing for a video communication system that transmits and receives video data.

CITATION LIST

Patent Literature

Patent Literature 1: JP 2008-294564 A
Patent Literature 2: JP 2018-88711 A

SUMMARY

Technical Problem

However, even if the telepresence provides the realistic feeling, the users may feel cognitive dissonance, that is, some kind of feeling of strangeness or discomfort, due to an environmental difference between mutual spaces or a communication delay.

Excessive limitation of transmission information due to resolving the cognitive dissonance may lead to excessive consideration of privacy between the users who have no close and reliable relationship, and thus, even if there is not so serious problem, it may take time to build an affinity relationship between the users.

Furthermore, as a measure against the communication delay, it can be considered to resolve the dissonance by ultra-low delay image processing or the like. However, in a case of the communication through an Internet line other than a limited network environment, such as a dedicated line or a specific facility, generation of a delay of approximately 100 msec is inevitable depending on traffic delay due to congestion of data or physical distance such as communication from abroad.

Solution to Problem

According to the present disclosure, an information processing apparatus is provided that includes: a reception unit that receives data from a communication destination; an output unit that outputs the received data; a sensor that senses a first space in which the output unit is arranged; a transmission unit that transmits sensing data obtained by the sensing to the communication destination; and a control unit that performs control to present an event that is a cause of cognitive dissonance to the output unit, based on at least the sensing data of a user in the first space, when the user has the cognitive dissonance.

According to the present disclosure, an information processing method is provided that includes: a processor receiving data from a communication destination; outputting the received data from an output unit; sensing a first space in which the output unit is arranged; transmitting sensing data obtained by the sensing to the communication destination; and performing control to present an event that is a cause of cognitive dissonance to the output unit, based on at least the sensing data of a user in the first space, when the user has the cognitive dissonance.

According to the present disclosure, a program is provided that causes a computer to function as: a reception unit that receives data from a communication destination; an output unit that outputs the received data; a sensor that senses a first space in which the output unit is arranged; a transmission unit that transmits sensing data obtained by the sensing to the communication destination; and a control unit that performs control to present an event that is a cause of cognitive dissonance to the output unit, based on at least the sensing data of a user in the first space, when the user has the cognitive dissonance.

BRIEF DESCRIPTION OF DRAWINGS

FIG. 6 is a diagram illustrating an example of a feedback presentation made in a case of a transmission delay, according to an embodiment of the present disclosure.

DESCRIPTION OF EMBODIMENTS

Figure 1:
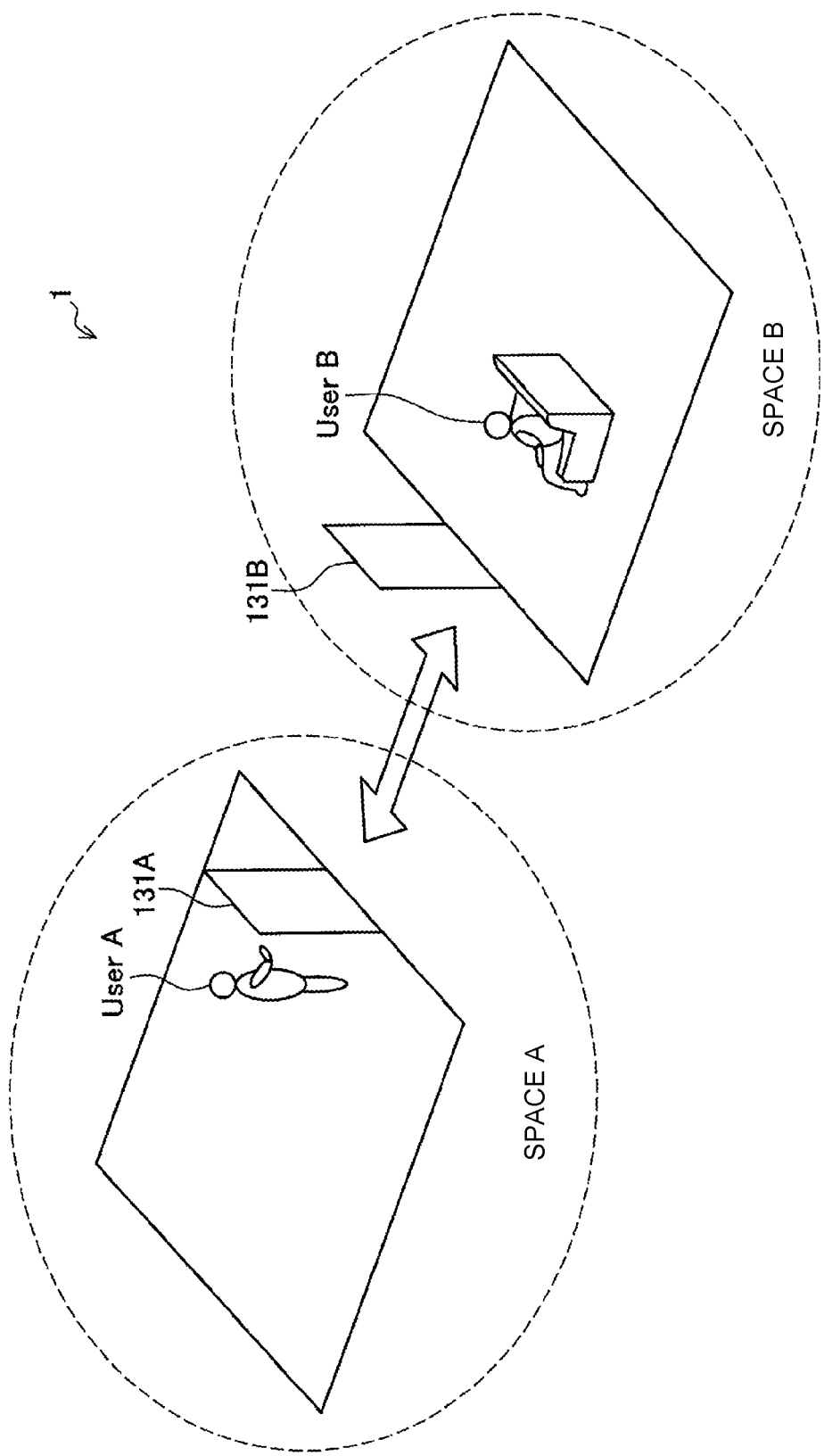
FIG. 1 is a diagram illustrating an overview of an information processing system according to an embodiment of the present disclosure.

Preferred embodiments of the present disclosure will be described in detail below with reference to the accompanying drawings. Note that in the present description and the drawings, component elements having substantially the same functional configurations are designated by the same reference numerals and symbols and redundant description thereof will be omitted.

In addition, the description will be given in the following order.

1. Overview
2. Configuration Example
2-1. System Configuration Example
2-2. Configuration Example of Apparatus
3. Operation Process
4. Feedback Example
4-1. Feedback at Occurrence of Cognitive Dissonance Due to Long Delay Time
4-2. Feedback at Occurrence of Cognitive Dissonance Due to Feeling of Privacy Invasion
4-3. Feedback at Occurrence of Cognitive Dissonance Due to Expression on User'S Face That Gives Feeling of Discomfort to Other Person
4-4. Feedback at Occurrence of Cognitive Dissonance Due to Lack of Communication Band
4-5. Feedback at Occurrence of Cognitive Dissonance Due to Sound Volume
5. Conclusion

1. Overview

FIG. 1 is a diagram illustrating an overview of an information processing system according to an embodiment of the present disclosure. As illustrated in FIG. 1, an information processing system 1 according to the present embodiment is an adjacency telepresence system that connects distant locations (e.g., a space A and a space B) by an information channel such as video and voice.

Specifically, when space information (video and voice) is acquired by sensors (a camera and a microphone) installed in either space, the present system transmits the space information to the space of the other person in real time and outputs the space information. The space information is output from, for example, output devices (displays 131 and speakers (not illustrated)) installed on walls or the like of the respective spaces. The displays 131 (131A and 131B) are used as a virtual doorway or window connecting between the spaces of the other persons (e.g., the displays having a size large enough to passage of a person are installed).

Constant real-time transmission and reception of the space information between a plurality of the spaces (connection of the spaces) makes it possible for each of the users in the respective spaces to see the state of the space of the other person from the virtual doorway or window at any time, and each user can always feel the presence of a predetermined next space and feel as if the users are in the same space (realistic feeling). Here, a state of communication in the adjacency telepresence to which the information processing system 1 according to the present embodiment is applied will be described with reference to FIG. 2.

Figure 2:
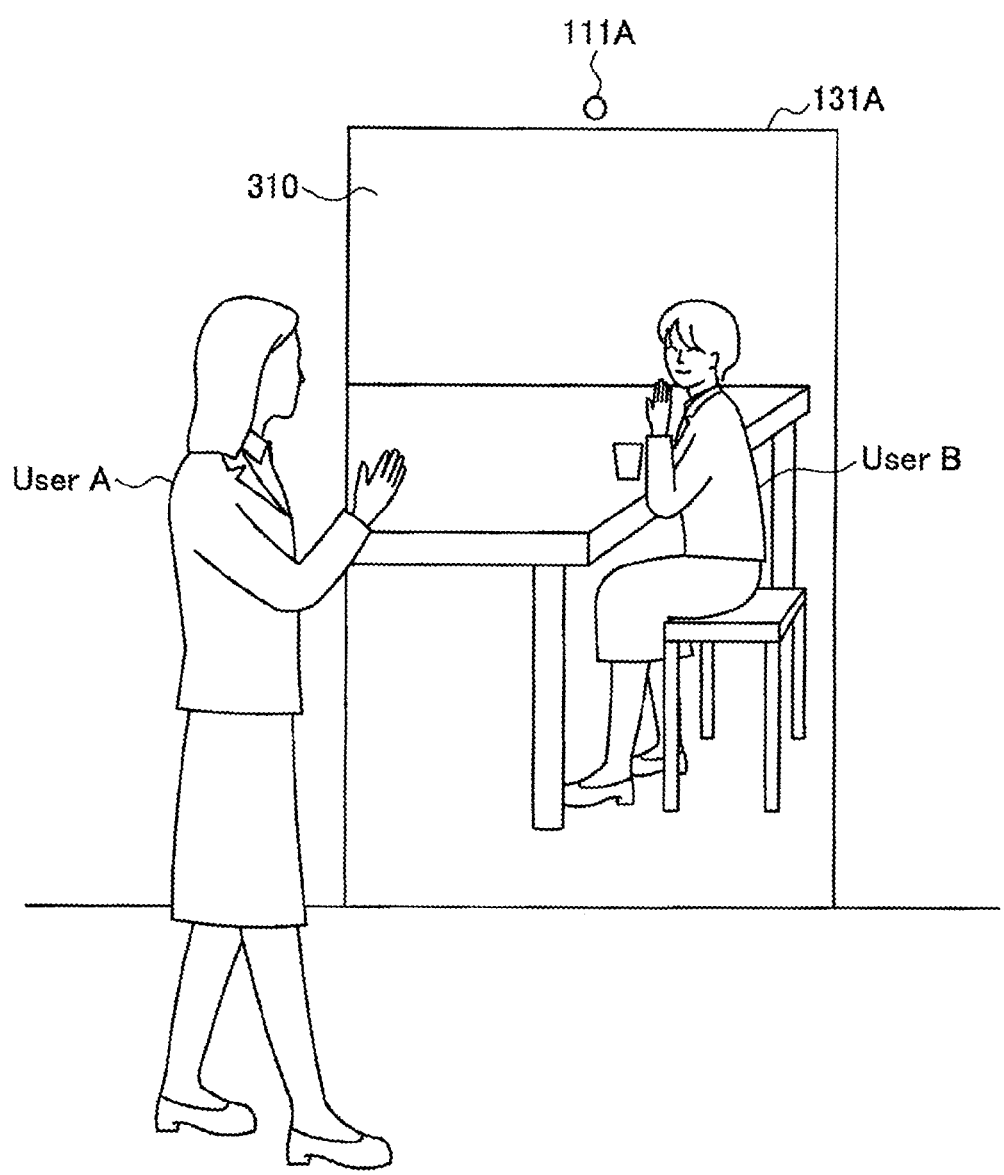
FIG. 2 is a diagram illustrating a state of communication using the information processing system according to the present embodiment.

In the example illustrated in FIG. 2, the display 131A that is large in size is installed on a wall or the like of a room (e.g., an office) in the space A, and a camera 111A, a microphone (not illustrated), and a speaker (not illustrated) are installed around the display 131A or on the display 131A. A plurality of the cameras 111A, the microphones, and the speakers may be provided. The arrangement places for the camera 111A, the microphone, and the speaker are not particularly limited, but the camera 111A preferably images the state of the space A from the display 131A toward the inside of the room (space A), as the imaging direction. Note that a display, a camera, a microphone, and a speaker are installed similarly in the space B (e.g., another office).

A video captured by the camera installed in the space B that is connected by communication is displayed on the display 131A in real time. As illustrated in FIG. 2, the display 131A may display a video 310 showing the space B on the entire screen. This configuration gives a feeling that the space B is immediately next to the wall of the space A. In addition, on the display 131A, the video 310 showing the space B may be displayed deeper, at a slightly distant place so as to have a virtual space between the space B and the display. Such a depth may be adjusted by the user (also referred to as "adjustment in a feeling of connectedness"). Providing the depth makes it possible to provide a feeling as if the other person is in a slightly distant place, alleviating a psychological burden (i.e., always seen by the other person nearby) as compared with a situation in which there is the other person nearby. Furthermore, the virtual space is usable in various ways, for example, a virtual object is displayed in the virtual space so as to be shared with the other person.

Sizes and installation positions of the displays 131 (131A and 131B) are not particularly limited. For example, as illustrated in FIG. 2, the display 131A may have a size larger than that of a human so that the display 131A has a lower side positioned near a floor. Alternatively, the size of the display 131A may be as large as the upper body of a human and the lower side thereof may be positioned at about the height of the human waist.

Furthermore, a cameras 111, the microphones, and the speakers are installed around the displays 131. Each of the speakers outputs sounds (various environmental sounds such as sounds of opening and closing of a door, sound of footsteps, noise, and sound heard from the outside of a window of the space of the other person, in addition to talking voice) acquired in the space of the other person, and thus, it is possible to feel the atmosphere and aura of the space of the other person even if the other person cannot be seen.

Furthermore, a conventional video chat (video phone) using an information communication terminal such as a conventional smartphone, tablet terminal, or personal computer (PC) provides a conversation with a purpose is held by calling the other person when there is a business. However, the adjacency telepresence system according to the present embodiment is basically always connected to the space of the other person, and thus, it is easy to talk to the other person or have an ordinary conversation, effectively increasing communication. In addition, even when the face of the other person cannot be seen in the virtual window, the voice can be heard, thus enabling a conversation without looking at the face of the other person.

BACKGROUND

Here, the adjacency telepresence system enables easy communication by always being connected to the space of the other person in real time, and establishment of an affinity relationship can be expected. However, an environmental difference between the mutual spaces or a communication delay may make the users feel cognitive dissonance, that is, some kind of feeling of strangeness or discomfort.

Excessive limitation of transmission information (raising the level of the adjustment in the feeling of connectedness (i.e., taking a large distance and distantly displaying video of the other person in a small size), lowering the quality, amount, clarity of an information channel, or the like) due to resolving the cognitive dissonance may lead to excessive consideration of privacy between the users who have no close and reliable relationship, and thus, even if there is not so serious problem (e.g., even if the users have the feelings of strangeness that could be ignored when the users get used to the feeling), it may take time to build an affinity relationship between the users. Furthermore, due to the occurrence of the cognitive dissonance, it may be easily recognized that the space of the other person is not an actual adjacent space, leading to a loss of the realistic feeling.

Therefore, in the present embodiment, in order to make each user to be aware of the reason why the cognitive dissonance occurs, an event that is the cause of the cognitive dissonance is made possible to be optimally fed back to the user. Thus, it is expected that the user can correctly know and understand the event being the cause of the occurrence of the cognitive dissonance that the user feels, and the cognitive dissonance is resolved. As described above, in the present embodiment, the cognitive dissonance is resolved by making the person aware of the reason of the cognitive dissonance, instead of adjusting the environment, such as limitation of the transmission information. Therefore, it is possible to avoid hindrance of building the affinity relationship between the users due to excessive limitation of the transmission information.

2. Configuration Example

<2-1. System Configuration Example>

Figure 3:
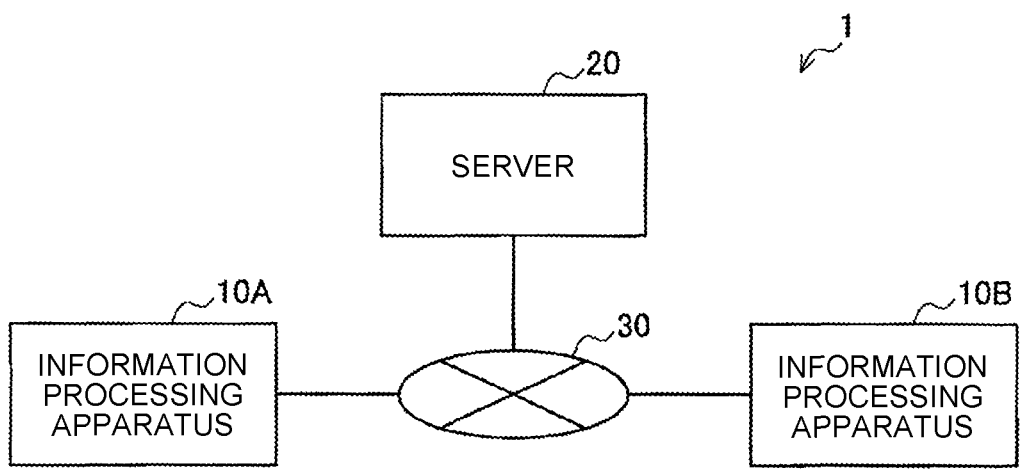
FIG. 3 is a diagram illustrating an example of a configuration of the information processing system according to the present embodiment.

Next, a configuration of the information processing system according to the present embodiment will be described with reference to FIG. 3. FIG. 3 is a diagram illustrating an example of the configuration of the information processing system according to the present embodiment.

As illustrated in FIG. 3, the information processing system 1 according to the present embodiment includes a plurality of information processing apparatuses 10 (10A and 10B) and a server 20. The information processing apparatus 10A, the information processing apparatus 10B, and the server 20 are communicably connected via a network 30.

Each of the information processing apparatuses 10 controls input and output of the space information by using an input unit and an output unit provided in each space. Specifically, the information processing apparatus 10A acquires the space information such as the video and voice of the space A, from the input unit installed in the space A, and transmits the space information to the server 20 or the information processing apparatus 10B. Furthermore, the information processing apparatus 10A performs control to output the space information (the video and voice) of the information processing apparatus 10B received from the information processing apparatus 10B or the server 20, from the output unit installed in the space A.

The server 20 may store the space information of each space transmitted from each information processing apparatus 10.

The information processing system according to an embodiment of the present disclosure has been described above. Note that although FIG. 3 illustrates the configuration including the server 20, this is merely an example, and a plurality of information processing apparatuses 10 may be communicably connected via the Internet or a dedicated line.

Next, a configuration of each information processing apparatus 10 included in the present system will be described.

<2-2. Configuration Example of Apparatus>

Figure 4:
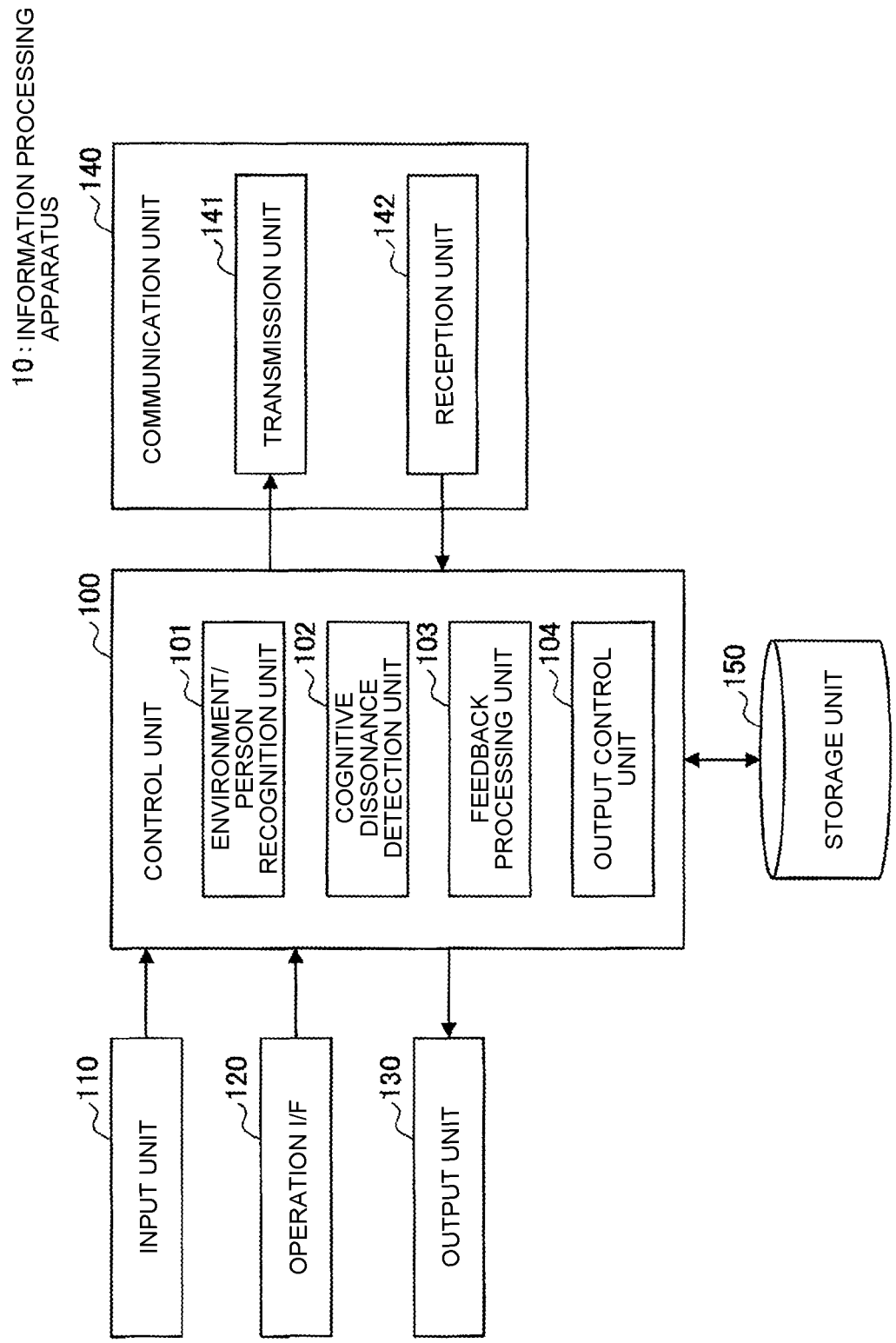
FIG. 4 is a block diagram illustrating an example of a configuration of an information processing apparatus according to the present embodiment.

FIG. 4 is a block diagram illustrating an example of the configuration of the information processing apparatus 10 according to the present embodiment. As illustrated in FIG. 4, the information processing apparatus 10 includes a control unit 100, an input unit 110, an operation interface (I/F) 120, an output unit 130, a communication unit 140, and a storage unit 150.

(Control Unit 100)

The control unit 100 functions as an arithmetic processing device and a control device, and controls the overall operation in the information processing apparatus 10 according to various programs. The control unit 100 is implemented by, for example, an electronic circuit such as a central processing unit (CPU) or a microprocessor. Furthermore, the control unit 100 may include a read only memory (ROM) that stores programs, operation parameters, and the like to be used, and a random access memory (RAM) that temporarily stores parameters and the like changing appropriately.

The control unit 100 performs control to acquire various types of space information (sensor data and context) from the input unit 110, accumulate the acquired space information in the storage unit 150, and further transmit the space information from a transmission unit 141 to the server 20. From the input unit 110, for example, video, sound, depth information, and the like sensed by various sensors relating to the environment and person in the corresponding space are obtained. The control unit 100 may accumulate information subjected to predetermined processing such as noise processing and compression and transmit the information.

Furthermore, the control unit 100 according to the present embodiment also functions as an environment/person recognition unit 101, a cognitive dissonance detection unit 102, a feedback processing unit 103, and an output control unit 104.

The environment/person recognition unit 101 performs context recognition such as recognition of an environment in the space and recognition of a person (user recognition), on the basis of various types of space information obtained from the input unit 110. The recognition of the environment includes, for example, object recognition (what is where), recognition of the temperature and humidity of the space, and the like. Here, the object may include a living organism other than a person, such as a plant or an animal. Furthermore, the user recognition includes, for example, identifying a person in the space by comparison with a face image registered in advance, and recognizing the position of each user in the space (where the user is in the room), the posture of each user (walking, sitting, standing, or the like), emotion (laughing, getting angry, or the like), the movement of each user (what the user is doing), and the like. Furthermore, the control unit 100 is also operable to recognize the speaking voice of the user on the basis of voice information obtained from the input unit 110.

Various recognition results by the environment/person recognition unit 101 may be added to the space information so as to be accumulated in the storage unit 150, or may be transmitted from the transmission unit 141 to the server 20.

The cognitive dissonance detection unit 102 estimates whether the cognitive dissonance (some kind of feeling of strangeness or discomfort) occurs to the user during the adjacency telepresence. The mechanism of occurrence of the cognitive dissonance is, in broad terms, output as a result of the processing of a comparator (diff) between an internal model (subjectivity, conception, ideal, and experience-base) in the cognitive process of the user who is the subject and a physical input (external stimulation and sensory-base). When the physical input (e.g., viewing the video of the space of the other person, hearing the sound of the space of the other person, and feeling the ambient temperature, humidity, wind, and the like), received from the other user who is the object or the space that is a connection destination, is different from a prediction of the future (the future that is closest to the present), generated from the internal model, a difference between the physical input and the prediction of the future causes the cognitive dissonance such as the feeling of strangeness or discomfort. Meanwhile, in conventional communication in the same space, it can be said that actual surrounding users and environments directly physically perceived are less likely to cause a gap from the internal model. However, in a remote space, it can be said that the cognitive dissonance is likely to occur due to an environmental difference (light, sound, odor, temperature, humidity, and the like) due to a physical distance, communication delay/limitation of transmission information (imperfection in a physical input), and a difference in atmosphere or mood felt by the user. In the adjacency telepresence according to the present embodiment, the space of the other person is presented as if in the same space (immediately nearby), but the actual remote space, that is, the physical distance may cause the user to feel the cognitive dissonance. The cognitive dissonance detection unit 102 detects that such cognitive dissonance occurs to the user.

The cognitive dissonance detection unit 102 is operable to, for example, analyze and interpret user information and system information that are sensed by the input unit 110 to estimate the occurrence of the cognitive dissonance. The user information is biological information (pulse, heart rate, amount of perspiration, body temperature, blinking, myoelectric value, respiration, brain wave, and the like), an expression on the user's face, user's physical state (states of the mouth, eyebrows, nose, and eyes (number of times and speed of blinking, movement of pupils, visual line, and the like), facial complexion (flushing of the face and the like), orientation of the head, intentional/unintentional gesture, posture, body orientation, and the like), an intentional/unintentional speech, and the like of the user, and analysis and interpretation of the states and changes make it possible to estimate the occurrence of the cognitive dissonance. Furthermore, the system information is information such as a control state (transmission state, output state of video and voice, and the like) of the present system, a change in status, and a difference in environment of the mutual spaces, and analysis and interpretation of the states and changes makes it possible to estimate the occurrence of the cognitive dissonance. Furthermore, analysis and interpretation of a correlation between a change in the user information and a change in the system information also makes it possible to estimate the occurrence of the cognitive dissonance.

For example, the cognitive dissonance (D; Dissonance) of the subject user S to the objects $O_1, O_2, \ldots$ (a person, object, surrounding environment, and the like shown in the video of the space of the other person) can be calculated as shown in the following Formula 1. In the following Formula 1, I is the internal model, P is the physical input, and diff is comparison processing.

$$D_{S \to O_1} = \text{Diff}(I_{S \to O_1} \leftrightarrow P_{S \to O_1}) \quad \text{(Formula 1)}$$
$$D_{S \to O_2} = \text{Diff}(I_{S \to O_2} \leftrightarrow P_{S \to O_2})$$
$$\ldots$$
$$D_{S \to O} = \Sigma \, \text{Diff}(I_{S \to O} \leftrightarrow P_{S \to O})$$

Then, the dissonance of each object that the subject feels is estimated by the following Formula 2. In the following Formula 2, f(x) is a function that extracts the dissonance, from the user information (biological information, expression on the user's face, body, and speaking voice) and the system information (control state and the like).

$$D'_{S \to O} = \Sigma f(D_{S \to O}) \quad \text{(Formula 2)}$$

The above processes work in association with each other, and the effects thereof are accumulated as a database for evaluation, improved by using a method of machine learning or the like to provide further effects.

Note that an estimation algorithm for the cognitive dissonance is not limited to the example described above.

The feedback processing unit 103 feeds back an event that is estimated to be the cause of the cognitive dissonance to the user. For example, the feedback processing unit 103 displays necessary items of a situation that is directly connected to the cognitive dissonance of the user or is likely to be directly connected to the cognitive dissonance of the user, on the display 131 on the user side, for a required time period. As a display method, it is desirable to provide an expression such that does not inhibit a natural feeling of connectedness with the space of the other person via the display 131. Furthermore, the feedback processing unit 103 may perform feedback when the degree of the detected dissonance is at a certain level or more. A specific example of a feedback method will be described later.

The output control unit 104 performs output control. The space information of the space of the other person that is always connected is received by a reception unit 142, and the space information is controlled to be output from the output unit 130 in real time.

(Input Unit 110)

The input unit 110 has a function of inputting the space information in the control unit 100. For example, the input unit 110 is implemented by the camera, the microphone, and the sensors. A plurality of the cameras may be provided to image the inside of the space and acquire captured images. Furthermore, a plurality of microphones may be provided to collect sounds in the space to acquire sound data. Furthermore, the sensors have functions of detecting various types of information in the space, and for example, a depth sensor (distance sensor), a human sensor, an infrared sensor, an illuminance sensor, and the like are assumed.

(Operation I/F 120)

The operation I/F 120 receives an operation input by the user and then outputs operation information to the control unit 100. The operation I/F 120 is implemented by, for example, a button, a switch, a keyboard, a touch sensor, or the like, and is provided around the display 131 or the like. Furthermore, the operation I/F 120 is connected in wireless/wired communication with a remote controller operated by the user, enabling acquisition of the operation information input by the user. The remote controller may be an infrared (IR) remote controller or a Bluetooth (registered trademark) remote controller. Furthermore, the remote controller may be a dedicated terminal, may be implemented by an information communication terminal such as a smartphone or a tablet terminal, or may be substituted by a game device (a game pad or the like). Furthermore, an input of the user operation is also enabled by a gesture such as a motion of a hand or speaking voice. Analysis of the gesture or the speaking voice is allowed to be performed by the control unit 100 on the basis of the captured image or voice information obtained from the input unit 110.

(Communication Unit 140)

The communication unit 140 is connected to the network 30 in a wired or wireless manner, is connected to the server 20 or the other information processing apparatus 10 via the network 30, and transmits and receives data. The communication unit 140 is communicably connected to the network 30 by, for example, a wired/wireless local area network (LAN), Wi-Fi (registered trademark), a mobile communication network (Long Term Evolution (LTE) and a third generation mobile communication system (3G)), or the like. Furthermore, as illustrated in FIG. 4, the communication unit 140 includes, as functional configurations, the transmission unit 141 that transmits information and the reception unit 142 that receives the information.

(Output Unit 130)

The output unit 130 outputs, for example, the space information of the space of the other person in real time, according to the control by the control unit 100. For example, the output unit 130 includes the display 131 and the speaker to output the image and voice. Here, the display 131 is used as an example, but an image display device is not limited to the display 131, and may be, for example, a projector. The information processing apparatus 10 may project the video of the space of the other person, on the wall of the room, in real time.

(Storage Unit 150)

The storage unit 150 is implemented by the read only memory (ROM) that stores programs, operation parameters, and the like used for processing of the control unit 100, and the random access memory (RAM) that temporarily stores parameters and the like changing appropriately.

The configuration of the information processing apparatus 10 according to the present embodiment has been specifically described above. Note that the configuration of the information processing apparatus 10 is not limited to the example illustrated in FIG. 4, and for example, part of the configuration may be implemented by a separate body and connected to the information processing apparatus 10 in a wireless/wired manner. In other words, the information processing apparatus 10 may include a plurality of devices. Furthermore, part of the processing performed by the control unit 100 of the information processing apparatus 10 may be performed by the server 20 or an intermediate server (not illustrated) located between the server 20 and the information processing apparatus 10.

3. Operation Process

Figure 5:
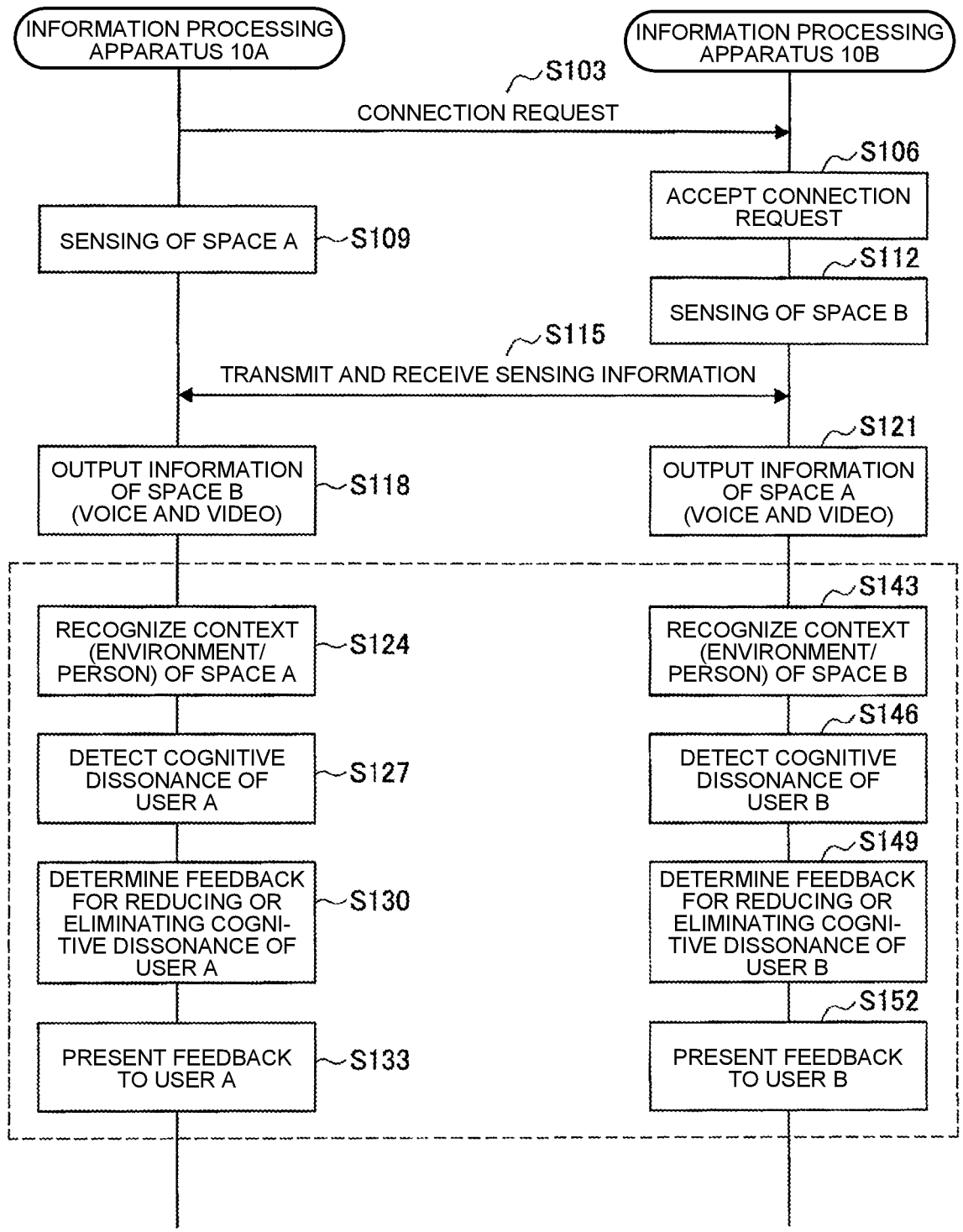
FIG. 5 is a sequence diagram illustrating an overall procedure of an operation process of the information processing system according to the present embodiment.

Next, a procedure of an operation process according to the present embodiment will be specifically described with reference to FIG. 5. FIG. 5 is a sequence diagram illustrating an overall procedure of the operation process of the information processing system according to the present embodiment. Note that, in the example illustrated in FIG. 5, the information processing apparatus 10A directly transmits and receives data to and from the information processing apparatus 10B, but the data may be transmitted and received via the server 20 as appropriate.

As illustrated in FIG. 5, firstly, the information processing apparatus 10A (or the information processing apparatus 10B) makes a connection request to the other information processing apparatus 10 in the space of the other person (Step S103), and when the connection request is accepted (Step S106), communication connection (continuous adjacency telepresence) is started.

Next, in each space, the space information (video, voice, and sensor information) is acquired by the sensors (Steps S109 and S112) and transmitted to the space of the other person in real time (Step S115).

Next, in each space, the space information received from the space of the other person is output from the output unit 130 (Steps S118 and S121).

Subsequently, while communication is connected and the space information received from the space of the other person is output from the output unit 130, detection and feedback of the cognitive dissonance can be performed in each space.

Specifically, the information processing apparatus 10A recognizes the context (environment and person) of the space A (a user space) (Step S124), and detects the cognitive dissonance of a user A (Step S127). More specifically, the recognition of the context is estimation of the internal model described above, and can be calculated from the biological information, expression on the face, movement of the body, surrounding environment, and the like of the user.

Next, the feedback for reducing or eliminating the cognitive dissonance of the user A is determined (calculated and generated) (Step S130), and the feedback is presented on the display 131 to the user A (Step S133).

Similar processing is enabled in the information processing apparatus 10B in the space B (Steps S143 to S152).

As described above, in the present system, when the cognitive dissonance of the user is detected in each space, the event that is the cause of the cognitive dissonance is fed back to the user himself/herself to make the user aware of the reason of the cognitive dissonance, enabling reduction or elimination of the cognitive dissonance.

4. Feedback Example

Next, an example of the feedback of the event that is the cause of the cognitive dissonance by the present system will be described using specific examples.

<4-1. Feedback at Occurrence of Cognitive Dissonance Due to Long Delay Time>

When a delay time is long, a lag in conversation between the users, simultaneous speech (speech contention), a delay in response movement, or the like occurs, which makes the user irritate or makes the user misunderstand that the other person is making a dishonest response (occurrence of the cognitive dissonance).

Therefore, when the occurrence of the lag in conversation between the users, simultaneous speech (speech contention), a delay in response movement, or the like makes the user irritate or feel uncomfortable, a video showing the user side causing the delay is displayed on a portion of the display 131 (to an extent not inhibiting the natural feeling of connectedness with the space of the other person), according to the delay length, thereby making the user recognize that such an event is not caused by the other person but by the communication environment, reducing or eliminating the cognitive dissonance. For example, this configuration makes it possible for the user to make a timely and slightly slow communication with the other person.

The video on the user side may be displayed, as if displayed on a half mirror (i.e., translucent). The translucent video makes it possible to avoid inhibition of the natural feeling of connectedness with the space of the other person.

Furthermore, each of the information processing apparatuses 10 may further display a numerical value, image, or animation that indicates what delay has occurred mutually.

Furthermore, the information processing apparatus 10 may hide the display of the feedback when a certain period of time has elapsed or the dissonance of the user is resolved (when the use's irritation is released).

(Feedback Processing)

More specifically, the information processing apparatus 10 recognizes the context of each space first. For example, the information processing apparatus 10 recognizes mutual transmission delay time caused by transmission network quality and apparatus performance, and acquires an attention level, distance, and the orientation of the head/body of each user with respect to the other user appearing on the display 131, distributions thereof, a frequency, density, and interval of conversation between the users, the speed/magnitude of movement and the presence/absence of gesture in the conversation, further acquiring the tone of voice, emotion, and presence/absence of unpleasant expression that can be acquired from a conversational speech between the users, and an expression on the face, gesture, biological information, and the like of each user.

Next, the information processing apparatus 10 detects the cognitive dissonance. For example, the information processing apparatus 10 may detect the dissonance by evaluating (refer to statistical data shared between the users and individual tendency and log data) a correlation of the user's conversation pace, motion speed, and recognition feedback time with a degree of sensitivity to the dissonance. Furthermore, the information processing apparatus 10 may search for and detect a specific characteristic element, environments, situation, and condition in which the user is sensitive to the dissonance. Furthermore, the information processing apparatus 10 may determine and detect whether presentation has a sufficient information quality according to a user's cognitive ability and attention level. The detection of the cognitive dissonance may be performed by score calculation.

For example, in a case where the user A prompts a user B (user in the space of the other person) to perform a quick movement (e.g., urge a quick response with an anticipatory response of 250 msec or less, specifically, the priming of Janken (rock-paper-scissors), or the like) but there is a delay of, for example, 500 msec in addition to an actual movement of the user B before the user A can confirm the response movement of the user B, it appears as if the other person made a dishonest response (e.g., the other person appears to cheat at rock-paper-scissors, see FIG. 6), and thus, it is estimated that the cognitive dissonance occurs (e.g., scoring 120).

Furthermore, in a case where there is a hierarchical relationship between the user A and the user B (boss and subordinate, or the like) and the user A who is the boss tends to be angry, the cognitive dissonance is likely to occur.

Furthermore, when the user B cannot perceive that the user A feels a delay and the user B cannot understand the situation of the user A getting angry, the cognitive dissonance occurs.

In this case, the information processing apparatus 10 displays, on the display 131A on the side of the user A, a mirror image of the user A by adding the delay that the other person (the user B) feels. Therefore, the user can recognize the state of the user himself/herself (delay in the motion of the user) that is seen by the other person, the user can recognize that the other person is not making the dishonest behavior but responding to delayed motion of the user, and the cognitive dissonance is reduced or eliminated. FIG. 6 is a diagram illustrating an example of a feedback presentation made in a case of the transmission delay. As illustrated on the left side of FIG. 6, in a case where the user A performs rock-paper-scissors with the user B with a delay in the response of the user B due to the transmission delay, the user A feels strangeness or discomfort. In this case, as illustrated on the right side of FIG. 6, the mirror image 40 of the user A is displayed on the display 131A, as if displayed on the half mirror, after adding the transmission delay, and thus, it is possible for the user A to intuitively grasp that the motion of the user himself/herself has the transmission delay, reducing or eliminating the cognitive dissonance.

Note that, displaying the mirror image of the user B on the display 131B on the side of the user B, as if displayed on the half mirror by adding the transmission delay makes it possible to cause the user B to understand that the response of the user B is transmitted to the other person with a delay.

The above processing may be performed by the information processing apparatuses 10 or may be performed by the server 20. Note that processing of other feedback examples described below may also be performed by the information processing apparatuses 10 or the server 20.

<4-2. Feedback at Occurrence of Cognitive Dissonance Due to Feeling of Privacy Invasion>

In the adjacency telepresence, for example, as illustrated in FIG. 2, each of the displays 131 installed on the wall or the like can be regarded as the doorway or window, making the remote space appear to be located nearby. In the actual same space, reproduction of light and matching of light facilitates to understand what the other person is looking into and who is looking at what. However, the video showing a space within the angle of view of the camera 111 is actually displayed on the side of the other person, and a blind spot of the camera 111 is not shown, but it is difficult for the user to understand the angle of view. In addition, the other user looking over here appears to look at the user, even if the other user actually looks at a different object, in some cases.

Figure 7:
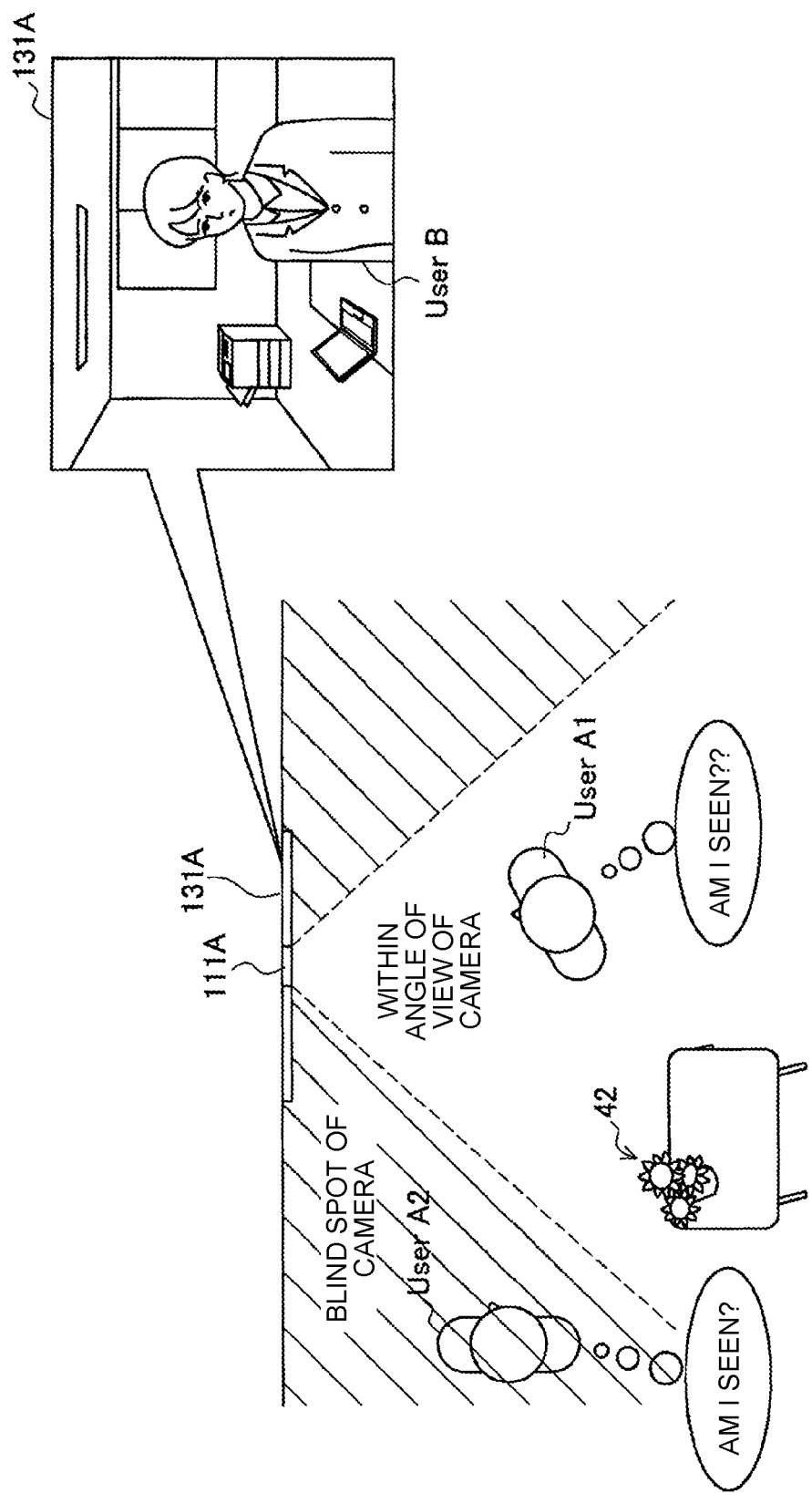
FIG. 7 is a diagram illustrating feeling of privacy invasion according to an embodiment of the present disclosure.

For example, in the example illustrated in FIG. 7, in a case where a video showing the user B looking over here is displayed on the display 131A in real time, a user A1 and a user A2 may have a feeling of anxiety, discomfort, or privacy invasion that the user B sees the users A1 and A2, leading to the occurrence of the cognitive dissonance.

However, in a case where the user B is actually looking at flower 42 in the space A, it is possible to reduce or eliminate the feeling of discomfort due to one-sided misunderstanding by presenting in the space A that the user B is looking at the flower 42.

Figure 8:
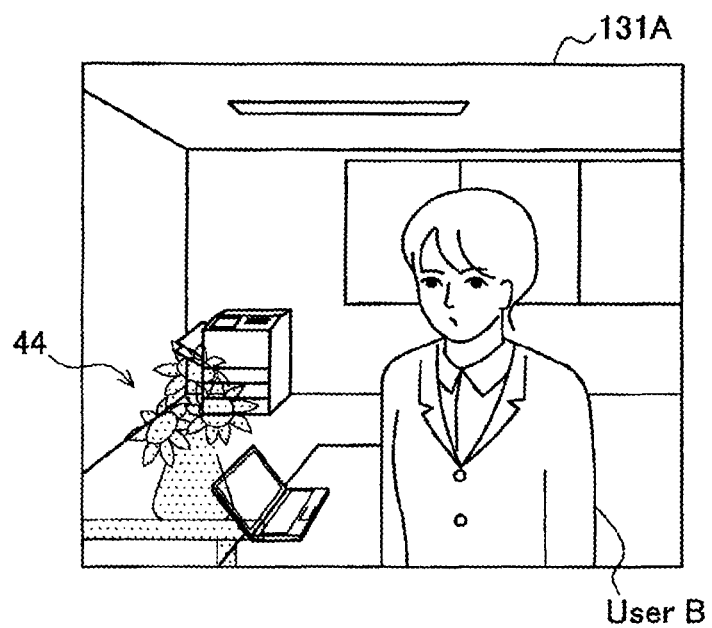
FIG. 8 is a diagram illustrating an example of a feedback presentation made in a case of the feeling of privacy invasion, according to an embodiment of the present disclosure.

For example, as illustrated in FIG. 8, display of a mirror image 44 (herein, the "mirror image" displayed, as if displayed on the half mirror (translucent) may not necessarily be displayed horizontally reversely) of the object to which the user B pays attention, on the display 131A provides relief to the user, reducing or eliminating the cognitive dissonance. This configuration makes it possible to transmit realistic information to each other as much as possible (without limiting transmission information and without ambiguous control), promoting an affinity effect.

(Feedback Processing)

More specifically, each information processing apparatus 10 recognizes the context of each space first. For example, the information processing apparatus 10 recognizes the presence/absence of the users in both spaces, identification of the users, the positions of the users, whether each user is ready to visually recognize the video on the display 131 (in terms of an angle or distance), whether the user is gazing at the video of the other user, the degrees of continuity and frequency of the gazing by the user, whether the user looks at or is interested in which target in the video of the other user, or the like.

Next, the information processing apparatus 10 detects the cognitive dissonance. For example, the information processing apparatus 10 detects the cognitive dissonance, on the basis of the frequency/tendency of the user to glance at the display 131 with nervousness, the expression (expression on the face or sigh), or speech ("It worries me", "Disgusting", "No", etc.) of the user, a search for a user-specific characteristic element, environment, situation, or condition that easily make the user feel discomfort, a motion of the user (movement such as walking while avoiding the vicinity of the display 131 or the angle of view of the camera, of an input of operation to lower a clarity level (lowering the feeling of connectedness)), or the like. The detection of the cognitive dissonance may be performed by score calculation.

For example, in a case where the user A feels that the user B monitors the user A or the action of the user A at all times or frequently and the user A may feel anxiety when hearing sound or the like of the space of the other person, even if the other person is not shown in the video, occurrence of the cognitive dissonance is estimated (e.g., scoring 90).

Furthermore, in a case where there is a possibility that the user A misreads the user B's viewing of an object in the space A which the user B is interested in, as the user B's monitoring of the user A, due to the lack of reproducibility of line-of-sight information, occurrence of the cognitive dissonance is estimated (e.g., scoring 52) (see FIG. 7).

Furthermore, in a case where the user A feels as if someone is in the space B even though no one is in the space B, or in a case where the user A feels anxiety that someone is looking in from a portion (blind spot) invisible from the user A side, the occurrence of the cognitive dissonance is estimated (e.g., scoring 35).

Figure 9:
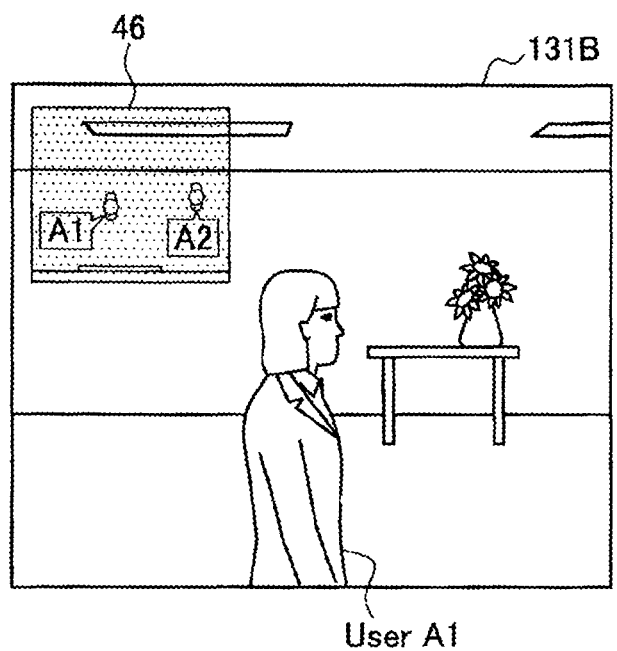
FIG. 9 is a diagram illustrating an example of a feedback presentation of information about a person existing in a space of the other person, according to an embodiment of the present disclosure.

In such cases, the information processing apparatus 10 may display gaze information on the side of the other person on the display 131, as if displayed on the half mirror. For example, as illustrated in FIG. 9, an image 46 may be displayed that represents information (who is where) about a person in the space of the other person in real time, with an icon or on a map. Therefore, it can be seen that the user A2 is in the space of the other person in addition to the user A1 shown on the display 131B, but the user A2 does not look in.

Furthermore, the information processing apparatus 10 may display information indicating a gaze direction of the other user and a frequency of the gazing. Furthermore, the information processing apparatus 10 may partially display a video of the user side, on the display 131 located on the user side, as if displayed on the half mirror, and may display a gaze heat map indicating that the attention is frequently paid to which portion. Furthermore, a mirror image of an object to which the attention is frequently paid may be displayed on the display 131 or who pays attention to the mirror image may be displayed in association with an icon or the like.

<4-3. Feedback at Occurrence of Cognitive Dissonance Due to Expression on User's Face that Gives Feeling of Discomfort to Other Person>

The user having an expression on the face giving a feeling of discomfort to the other person, such as anger or irritation, may wither or make the other person to feel distrust, and the cognitive dissonance tends to occur in communication with the other person, promoting no affinity effect. However, it is assumed that the conventional video call or the like cannot help the user to see his/her attitude objectively, and the user cannot understand the reason why he/she cannot communicate well with the other person and feels the distrust of the other person.

Figure 10:
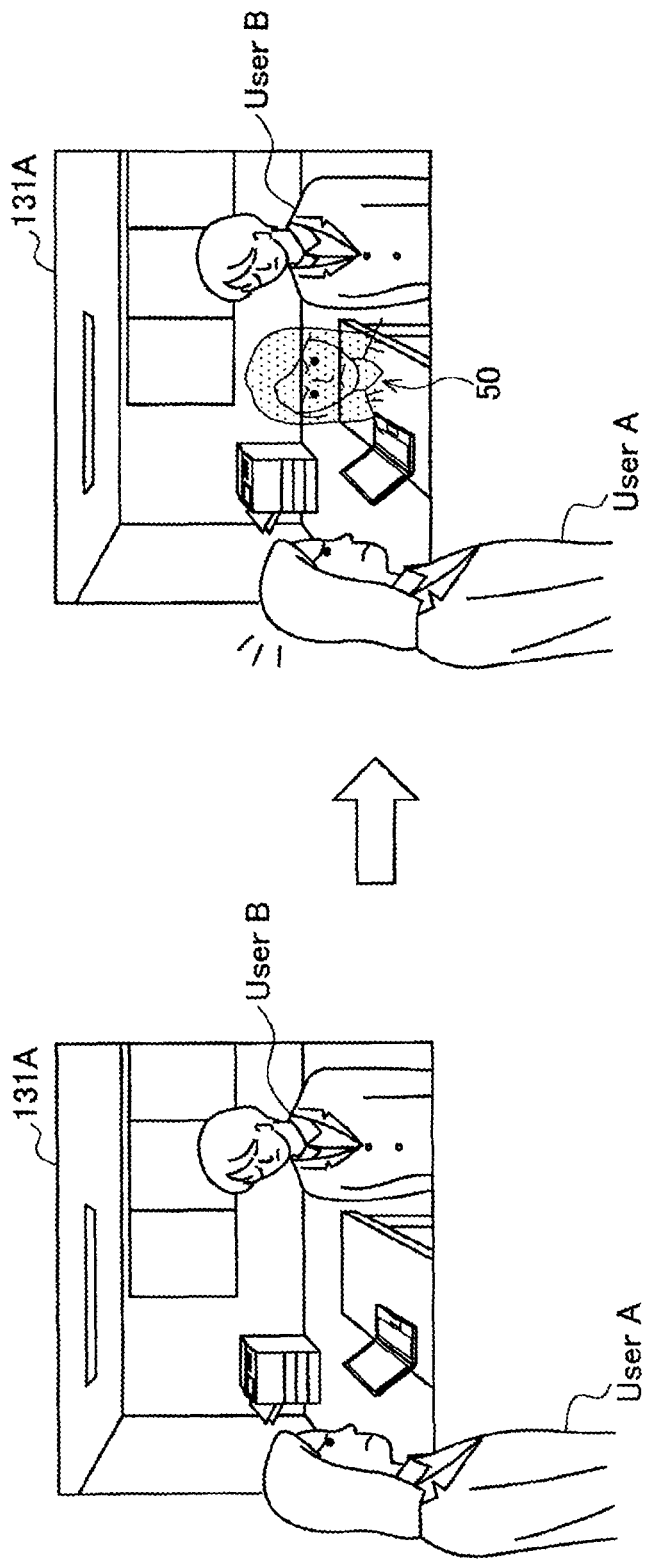
FIG. 10 is a diagram illustrating an example of a feedback presentation displaying a mirror image of a user, according to an embodiment of the present disclosure.

Therefore, for example, as illustrated in FIG. 10, displaying a mirror image 50 of the user A on the display 131A by the information processing apparatus 10 makes it possible for the user to be aware of the reason, and suppress an undesirable emotion by himself/herself, promoting the improvement of such a situation.

Furthermore, it is also assumed that a feeling of being not good at a specific user may cause the feeling of discomfort to the telepresence. Therefore, the information processing apparatus 10 displays the user's feeling of discomfort in a graph or the like for each object, thereby making it possible to make the user aware, make the user recognize that the user tends to feel discomfort to the specific user, reduce the user's feeling of disgust against the telepresence itself, and encourage the user to take a positive action to eliminate the feeling of being not good at the specific user.

Figure 11:
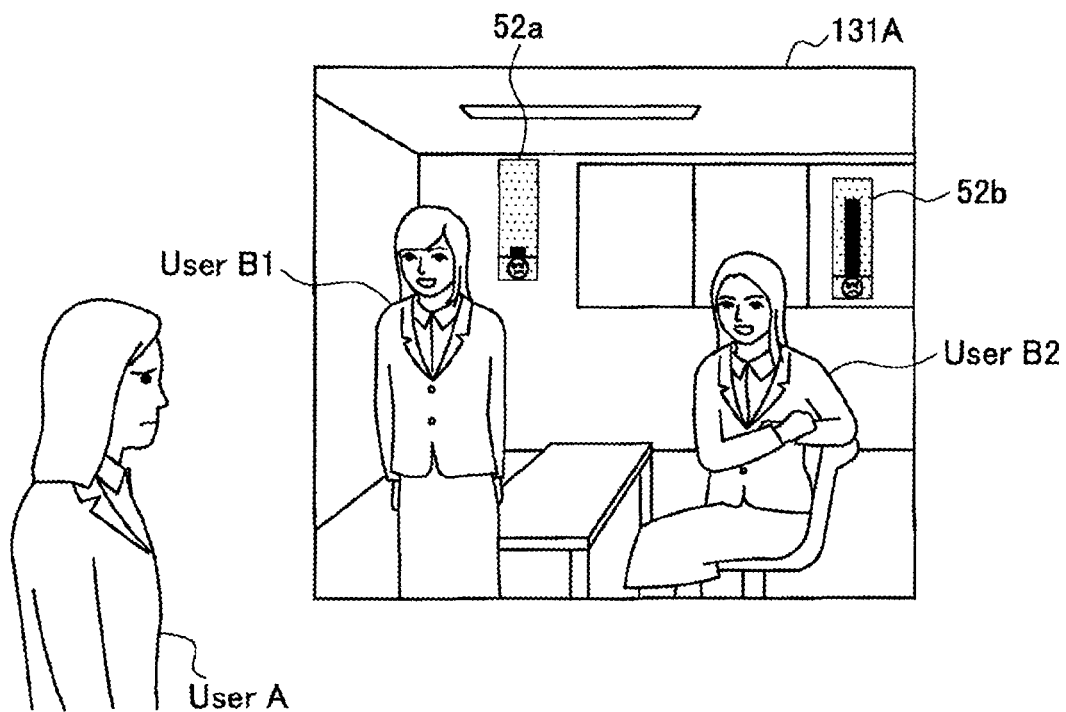
FIG. 11 is a diagram illustrating an example of a feedback presentation of the user's feeling of discomfort to a specific user, according to an embodiment of the present disclosure.

FIG. 11 is a diagram illustrating an example of the feedback presentation of the user's feeling of discomfort to the specific user, according to the present embodiment. As illustrated in FIG. 11, whether the user A feels discomfort when the user A looks at which user of a plurality of the other users shown on the display 131A (or when which user speaks) may be recognized, on the basis of the expression on the user A's face or the like to transparently display graph images 52 in association with each of the other users. This configuration makes the user A have an awareness that the user A has not the feeling of disgust against the telepresence itself but the feeling of being not good at a user B2 when the user A has some kind of feeling of strangeness or discomfort. Therefore, the positive action to eliminate the feeling of being not good at the user B2 can be expected.

<4-4. Feedback at Occurrence of Cognitive Dissonance Due to Lack of Communication Band>

In some cases, the feeling of discomfort or fatigue (e.g., eyestrain) is caused by deterioration in the quality of the video or sound due to insufficient resolution of the video.

In this case, simple notification (push notification, message, icon, or the like) of deterioration due to deterioration in communication situation or clear indication of which portion has how much deterioration compared with the normal quality (e.g., a person moving fast, a complicated pattern, or the like) may be employed. Alternatively, it is possible to make the user to intuitively recognize the limitation of the communication environment (difficulty in connection due to an environmental factor) by providing a wide depth (virtual space) to have a distance from the space of the other person (the space of the other person is displayed smaller) and presenting an expression (display of barrier or fog, insertion of the sound of wind or sandstorm, etc.) such that the limitation of the communication environment does not allow access to the space of the other person even if the user desires to approach the space of the other person.

<4-5. Feedback at Occurrence of Cognitive Dissonance Due to Sound Volume>

There is a case where the voice of the other user is loud and causes uncomfortable feeling, which may be actually caused by loud noise in the space of the other person (difference in noise environment from that the space of the other person. In some cases, the noise in the space of the other person is difficult to perceive through the microphone). In a case where the user feels uncomfortable due to the loud voice of the other user, the information processing apparatus 10 gives feedback such as display of a noise distribution map of the space of the other person, and makes the user recognize that the other user is not to blame, reducing or eliminating the cognitive dissonance.

Furthermore, in some cases, even though the user speaks to the other person, the other person has no response, causing the feeling of discomfort. However, in fact, it is assumed that the loud noise in the space of the other person interrupts the user's voice, the auditory characteristic of the other user makes the user's voice hard to listen, or a voice output environment on the side of the other person interrupts the user's voice to the other user. The information processing apparatus 10 shows a display for notifying the user of these situations, on the display 131.

Figure 12:
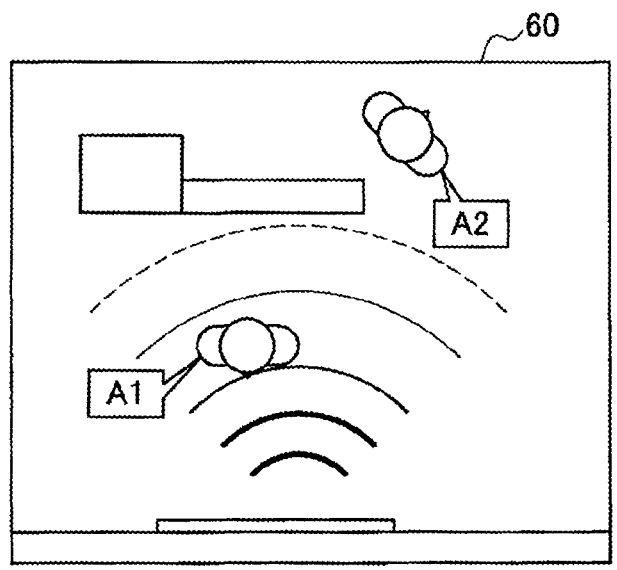
FIG. 12 is a diagram illustrating an example of a feedback presentation notifying the other user of the range of reach of voice, according to an embodiment of the present disclosure.

FIG. 12 is a diagram illustrating an example of the feedback presentation notifying the other user of the range of reach of voice. As illustrated in FIG. 12, displaying a map image 60 of the space of the other person in which the range of reach of the voice is represented by arcs in a simulation manner makes it possible to recognize, for example, that the no response of the user A2 is not due to a dishonest behavior of the user A2 but due to reach of no voice of the user/interruption of the voice of the user by an environment, reducing or eliminating the cognitive dissonance.

Note that an example of the cognitive dissonance of the user caused by a difference in environment from the space of the other person is not limited to the sound environment described above, and is also assumed to be caused by a difference in environment such as temperature, humidity, and light (illumination). For example, in a case where the environment of the space of the other person is very warm or has high humidity as compared with the user space, the atmosphere or mood is different between the spaces, and thus, it is assumed that the feeling of strangeness may be caused in communication. Therefore, the information processing apparatus 10 performs air-conditioning control to output hot air or raise humidity by, for example, an air-conditioner provided around the display 131, thereby allowing the user to perceive and share the environment of the space of the other person, reducing or eliminating the cognitive dissonance.

5. Conclusion

As described above, preferred embodiments of the present disclosure have been described in detail with reference to the accompanying drawings, but the present technology is not limited to these examples. A person skilled in the art may obviously find various alternations and modifications within the technical concept described in claims, and it should be understood that they will naturally come under the technical scope of the present disclosure.

For example, the feedback to the user is not limited to the video, and may be sound, vibration, or the like. Furthermore, sound in association with the video may be output and fed back. For example, in a case where the sound is heard with a delay due to a transmission delay, or in a case where the voice of the user is heard too loud on the side of the other person, the delay may be added to the voice of the user by using an expression such as an echo, or the volume of the voice may be raised and fed back to the user. In addition, whether there is a person in the invisible place of the space of the other person may be fed back by making feel the aura by sound. Furthermore, the feedback may be provided to the user, from a remote controller used by the user, a speaker device (acoustic device) separately provided in the space, a mobile terminal such as a smartphone, shoulder headphones, or another wearable device, in addition to output from the main body of the information processing apparatus 10 (the display 131, the speaker, or the like). In addition, the feedback may be provided through various information presentation devices compatible with the environment.

Furthermore, the present system may be configured to learn a situation in communication between usual fixed users and a tendency of the cognitive dissonance (including a habit of the user) to occur, for optimal feedback. In addition, in the present system each user can analyze the tendency and characteristics of a data group relating to the trend of the environment to perform optimal processing in the individual scenes, and aggregate information groups in all scenes to perform big data analysis, for optimization processing for a wide range of general-purpose scenes.

Furthermore, it is also possible to create a computer program for causing hardware such as CPU, ROM, and RAM incorporated in the information processing apparatus 10 and the server 20 described above to perform functions of the information processing apparatus 10 and the server 20. In addition, a computer-readable storage medium storing such a computer program is also provided.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Note that the present technology may also employ the following configurations.

(1)

An information processing apparatus comprising: a reception unit that receives data from a communication destination;

an output unit that outputs the received data;

a sensor that senses a first space in which the output unit is arranged;

a transmission unit that transmits sensing data obtained by the sensing to the communication destination; and a control unit that performs control to present an event that is a cause of cognitive dissonance to the output unit, based on at least the sensing data of a user in the first space, when the user has the cognitive dissonance.

(2)

The information processing apparatus according to (1), wherein the output unit includes a display unit, and the control unit when the event that is the cause is included in a video of the first space transmitted to the communication destination, controls a portion of the display unit that displays a video of a second space being the communication destination received from the communication destination to display the video of the first space.

(3)

The information processing apparatus according to (2), wherein the control unit performs control to display, as the video of the first space, a video of the user on the portion of the display unit.

(4)

The information processing apparatus according to (2) or (3), wherein the control unit performs control to display a translucent video of the first space on the display unit.

(5)

The information processing apparatus according to any one of (2) to (4), wherein the control unit performs control to display information indicating a state of the other user at the communication destination, on a portion of the display unit.

(6)

The information processing apparatus according to (5), wherein the control unit performs control to display gaze information of the other user at the communication destination, on a portion of the display unit.

(7)

The information processing apparatus according to (5) or (6), wherein the control unit performs control to superimpose and display, on the display unit, a video of an object in the first space gazed by the other user appearing in the video of the second space of the communication destination displayed on the display unit.

(8)

The information processing apparatus according to any one of (5) to (7), wherein when the occurrence of the cognitive dissonance is caused by a communication environment with the communication destination, the control unit performs control to perform processing in consideration of the communication environment on the video of the first space and display the video on a portion of the display unit.

(9)

The information processing apparatus according to any one of (5) to (8), wherein when the occurrence of the cognitive dissonance is caused by a difference in environment from the communication destination, the control unit performs control to perform processing in consideration of the environment on the video of the first space and display the video on a portion of the display unit.

(10)

The information processing apparatus according to any one of (1) to (9), wherein the control unit estimates the occurrence of the cognitive dissonance, based on a correlation between a change in the sensing data of the user and a surrounding environment physically input to the user.

(11)

An information processing method comprising:

a processor receiving data from a communication destination;

outputting the received data from an output unit;

sensing a first space in which the output unit is arranged;

transmitting sensing data obtained by the sensing to the communication destination; and performing control to present an event that is a cause of cognitive dissonance to the output unit, based on at least the sensing data of a user in the first space, when the user has the cognitive dissonance.

(12)

A program for causing a computer to function as:

a reception unit that receives data from a communication destination;

an output unit that outputs the received data;

a sensor that senses a first space in which the output unit is arranged;

a transmission unit that transmits sensing data obtained by the sensing to the communication destination; and a control unit that performs control to present an event that is a cause of cognitive dissonance to the output unit, based on at least the sensing data of a user in the first space, when the user has the cognitive dissonance.

REFERENCE SIGNS LIST

1 INFORMATION PROCESSING SYSTEM
(10A and 10B) INFORMATION PROCESSING APPARATUS
20 SERVER
30 NETWORK
100 CONTROL UNIT
101 ENVIRONMENT/PERSON RECOGNITION UNIT
102 COGNITIVE DISSONANCE DETECTION UNIT
103 FEEDBACK PROCESSING UNIT
104 OUTPUT CONTROL UNIT
110 INPUT UNIT
120 OPERATION I/F
130 OUTPUT UNIT
131 DISPLAY
140 COMMUNICATION UNIT
150 STORAGE UNIT

The invention claimed is:

1. An information processing apparatus, comprising:
a reception unit configured to receive data from a communication destination;
an output unit configured to output the received data;
a sensor configured to:
sense a first space that includes a user of the information processing apparatus and the output unit;
output sensing data of the user in the first space based on the sensed first space;
a transmission unit configured to transmit the sensing data of the user in the first space to the communication destination; and
a control unit configured to control the output unit to present, to the user in the first space, an event that is a cause of cognitive dissonance of the user in the first space,
wherein the control of the output unit to present the event is based on at least the sensing data of the user in the first space.

2. The information processing apparatus according to claim 1, wherein
the output unit includes a display unit,
the control unit is further configured to control, in a case where the event that is the cause is included in a video of the first space transmitted to the communication destination, the display unit to concurrently display a video of a second space received from the communication destination and the video of the first space, and
the second space corresponds to the communication destination.

3. The information processing apparatus according to claim 2, wherein the control unit is further configured to control the display unit to display, as the video of the first space, a video of the user in the first space on a portion of the display unit.

4. The information processing apparatus according to claim 2, wherein the control unit is further configured to control the display unit to display a translucent video of the first space on the display unit.

5. The information processing apparatus according to claim 2, wherein the control unit is further configured to control the display unit to display information indicating a state of a user in the second space, on a portion of the display unit.

6. The information processing apparatus according to claim 5, wherein the control unit is further configured to control the display unit to display gaze information of the user in the second space, on a portion of the display unit.

7. The information processing apparatus according to claim 5, wherein the control unit is further configured to control the display unit to superimpose and display, on the display unit, a video of an object in the first space gazed by the user appearing in the video of the second space displayed on the display unit.

8. The information processing apparatus according to claim 5, wherein in a case where an occurrence of the cognitive dissonance is caused by a communication environment with the communication destination, the control unit is further configured to:
execute, based on the communication environment, a specific process on the video of the first space; and
control, based on the executed specific process, the display unit to display the video of the first space on a portion of the display unit.

9. The information processing apparatus according to claim 5, wherein in a case where an occurrence of the cognitive dissonance is caused by a difference in environment from the communication destination, the control unit is further configured to:
execute, based on the environment, a specific process on the video of the first space; and
control, based on the executed specific process, the display unit to display the video of the first space on a portion of the display unit.

10. The information processing apparatus according to claim 1, wherein the control unit is further configured to estimate an occurrence of the cognitive dissonance, based on a correlation between a change in the sensing data of the user in the first space and a surrounding environment physically input to the user in the first space.

11. An information processing method, comprising:
in an information processing apparatus:
receiving data from a communication destination;
outputting the received data from an output unit of the information processing apparatus;
sensing a first space that includes a user of the information processing apparatus and the output unit;
outputting sensing data of the user in the first space based on the sensed first space;
transmitting the sensing data of the user in the first space to the communication destination; and
controlling the output unit to present, to the user in the first space, an event that is a cause of cognitive dissonance of the user in the first space,
wherein the control of the output unit to present the event is based on at least the sensing data of the user in the first space.

12. A non-transitory computer-readable medium having stored thereon, computer-executable instructions which, when executed by an information processing apparatus, cause the information processing apparatus to execute operations, the operations comprising:
receiving data from a communication destination;
outputting the received data from an output unit of the information processing apparatus;
sensing a first space that includes a user of the information processing apparatus and the output unit;
outputting sensing data of the user in the first space based on the sensed first space;
transmitting the sensing data of the user in the first space to the communication destination; and
controlling the output unit to present, to the user in the first space, an event that is a cause of cognitive dissonance of the user in the first space,
wherein the control of the output unit to present the event is based on at least the sensing data of the user in the first space.

* * * * *